US012348117B2

(12) United States Patent
Morgan et al.

(10) Patent No.: US 12,348,117 B2
(45) Date of Patent: Jul. 1, 2025

(54) HEATSINK

(71) Applicant: ETA GREEN POWER LIMITED, Hethel (GB)

(72) Inventors: David Morgan, Hethel (GB); Liam Bowman, Hethel (GB)

(73) Assignee: ETA GREEN POWER LIMITED (GB)

( * ) Notice: Subject to any disclaimer, the term of this patent is extended or adjusted under 35 U.S.C. 154(b) by 174 days.

(21) Appl. No.: 18/070,868

(22) Filed: Nov. 29, 2022

(65) Prior Publication Data

US 2023/0170766 A1 Jun. 1, 2023

(30) Foreign Application Priority Data

Nov. 30, 2021 (GB) .................................... 2117309
Nov. 11, 2022 (GB) .................................... 2216860

(51) Int. Cl.
*H02K 9/22* (2006.01)
*H02K 5/18* (2006.01)
*H02K 5/20* (2006.01)

(52) U.S. Cl.
CPC .............. *H02K 9/227* (2021.01); *H02K 5/18* (2013.01); *H02K 5/207* (2021.01)

(58) Field of Classification Search
CPC .......... H02K 9/227; H02K 5/207; H02K 5/18
See application file for complete search history.

(56) References Cited

U.S. PATENT DOCUMENTS

| 8,395,289 | B2* | 3/2013 | Tian .......................... H02K 9/06 310/64 |
|---|---|---|---|
| 11,174,937 | B2 | 11/2021 | Liou | |
| 2009/0120612 | A1 | 5/2009 | Zhang et al. | |
| 2011/0018373 | A1 | 1/2011 | Tian et al. | |
| 2011/0079370 | A1 | 4/2011 | Wen et al. | |
| 2011/0197417 | A1 | 8/2011 | Chin | |
| 2016/0106000 | A1* | 4/2016 | Tang-Kong ............. F28F 3/048 165/80.3 |

(Continued)

FOREIGN PATENT DOCUMENTS

| CN | 101662914 | | 3/2010 |
|---|---|---|---|
| CN | 101662914 A | * | 3/2010 |

(Continued)

OTHER PUBLICATIONS

Examination Report issued in Appl. No. 2216860.3 (Jan. 11, 2023).

(Continued)

*Primary Examiner* — Forrest M Phillips
(74) *Attorney, Agent, or Firm* — Barnes & Thornburg (57) ABSTRACT

Disclosed herein is a heatsink for removing heat from a heat source. The heatsink comprises a surface for placing adjacent to the heat source comprising a plurality of cavities formed into the surface, the plurality of cavities open on a side of the surface away from the side of the surface for placing adjacent to the heat source, and a plurality of projections, each projection extending from the surface adjacent to a corresponding cavity. Each cavity comprises a throat region configured to restrict the flow of air between each respective cavity and the region between a corresponding pair of projections extending from the surface adjacent to the cavity.

15 Claims, 7 Drawing Sheets

(56) References Cited

U.S. PATENT DOCUMENTS

2018/0103559 A1* 4/2018 Park ................. H05K 7/209

FOREIGN PATENT DOCUMENTS

| | | |
|---|---|---|
| CN | 103562631 A | 2/2014 |
| CN | 208768351 U | 4/2019 |
| CN | 214507713 U | 10/2021 |
| DE | 29807806 U1 | 7/1998 |
| JP | S4711302 U | 10/1972 |
| JP | S5132886 Y2 | 8/1976 |
| JP | S5999656 U | 7/1984 |
| JP | 2003161594 A | 6/2003 |
| WO | 2007/017741 | 2/2007 |
| WO | 2009/121226 | 10/2009 |
| WO | 2016/096042 A1 | 6/2016 |

OTHER PUBLICATIONS

Search Report issued in Appl. No. 2216860.3 (Jan. 10, 2023).
Extended European Search Report for Application No. 22209117.5-1202, dated Apr. 24, 2023, 9 pages.
Combined Search and Examination Reports for Application No. GB2117309.1, dated Jan. 10, 2023 and Jan. 11, 2023, 6 pages.
Combined Search and Examination Reports for Application No. GB2216860.3, dated Jan. 11, 2023, 13 pages.
Search and Examination Report issued in Appl. No. GB2117309.1 (Jan. 13, 2022).
First Office Action for Chinese Application No. 202211511891.8, dated Apr. 19, 2025, 10 pages.

* cited by examiner

HEATSINK

CROSS REFERENCE TO RELATED APPLICATIONS

This application claims priority under 35 USC § 119 from United Kingdom Patent Application No. 2117309.1, filed on Nov. 30, 2021 and United Kingdom Patent Application No. 2216860.3, filed on Nov. 11, 2022, the entirety of each are hereby fully incorporated by reference herein.

FIELD OF THE INVENTION

The present disclosure relates to a heatsink, and in particular a heatsink for use with an electric motor.

BACKGROUND

Electronics and electric motors get hot in use. Heatsinks are a known means for dumping and removing heat. However, with the ever-present demand for miniaturisation there is a need to make heat sinks more efficient at removing waste heat.

A known technique to remove heat from heat sinks is to use micro-channels. Examples of approaches making use of micro-channels are described in Azari et al., "A CFD technique to investigate the chocked flow and heat transfer characteristic in a micro-channel heat sink", International Journal of Computational Materials, Col. 4, No. 2 (2015), Jinzhi et al., "Micro-channel heat sink: a review), Journal of Thermal Science, Vol. 29, No. 6 (2020), and Kadam et al., "Twenty first century cooling solution: Microchannel heat sinks", International Journal of Thermal Sciences, 85 (2014).

SUMMARY OF THE INVENTION

Aspects of the invention are as set out in the independent claims and optional features are set out in the dependent claims. Aspects of the invention may be provided in conjunction with each other and features of one aspect may be applied to other aspects.

In a first aspect there is provided a heatsink for removing heat from a heat source. The heatsource may be an electric motor or it may be any other form of heat source. While many embodiments describe use with an electric motor it is understood that the heatsink may be used for other devices that are hot.

The heatsink comprises a surface for placing adjacent to the heat source comprising a plurality of cavities formed into the surface, the plurality of cavities open on a side of the surface away from the side of the surface for placing adjacent to the heat source, and a plurality of projections, each projection extending from the surface adjacent to a corresponding cavity. Each cavity comprises a throat region configured to restrict the flow of air between each respective cavity and the region between a corresponding pair of projections extending from the surface adjacent to the cavity.

The throat region of each cavity may comprise a region with a reduced width/constriction when viewed in cross-section to restrict the flow of air between the cavity and the region between a corresponding pair of projections extending from the surface adjacent to the cavity. Advantageously, providing a region with a reduced width/constriction may beneficially make use of the venturi principle to encourage the flow of air out of the cavity and away from the heatsink, for example in a direction perpendicular to the heatsink.

The plurality of cavities may comprise a plurality of parallel channels. The surface may comprise a curved surface, the curvature of the curved surface being about a longitudinal axis, and wherein the plurality of parallel channels are parallel to the longitudinal axis. The plurality of channels may have a partially circular cross-section when viewed along their length. The throat section may be formed by a chord of the partially circular cross-section.

Advantageously, providing a plurality of channels may encourage convective heat flow along the channels. For example, if regions of the heatsink are hotter than others (e.g. if the centre if hotter than the ends) this may encourage air flow along the channels (for example in a direction parallel to the surface of the heatsink) away from the centre of the heatsink towards the ends of the heatsink and away. In some examples, regions of the heatsink may be hotter than others because the heat source itself does not create heat evenly. Such an uneven heat distribution may be beneficial in that it encourages convective heat flow along the channels.

The plurality of projections may comprise a plurality of fins extending from the surface. Each of the plurality of fins may extend along and parallel to each channel. Each of the plurality of fins may have a camber extending away from the surface adjacent to each cavity. For example, each of the plurality of fins may have an aerofoil shape when viewed in a plane perpendicular to the surface. Providing fins that are aerofoil-shaped may further advantageously improve the flow of air away from the heatsink by making use of the Bernoulli effect.

In some examples the heatsink comprises a repeating pattern of channels and fins extending in a direction transverse to the longitudinal axis. For example, the heatsink may comprise a first series of repeating channels and fins in a first portion of the heatsink occupying a first length of the longitudinal axis, and a second series of repeating channels and fins in a second portion of the heatsink occupying a second length of the longitudinal axis. The first and second series of repeating channels may be offset with each other in a direction transverse to the longitudinal axis such that the channels and fins of the first and second series do not align in the longitudinal axis. Offsetting the series of repeating channels in this way may encourage a desired pattern or direction of airflow around the heatsink, thereby advantageously providing improved cooling.

In some examples, the heatsink comprises a proximal region, a central region, and a distal region, and wherein the heatsink comprises a plurality of projections and cavities in the proximal and distal regions, but no cavities or projections in the central region. When the surface comprises a curved surface, the curvature of the curved surface being about a longitudinal axis, the proximal and distal regions are at proximal and distal ends of the longitudinal axis.

In some examples the plurality of projections comprises a plurality of pyramidal structures extending from the surface.

In some examples the heatsink may comprise a series of intersecting channels and projections. For example, the heatsink may comprise a first series of repeating channels and a second series of repeating channels transverse to (for example, orthogonal to) the first series of repeating channels. The intersecting channels may be interposed with projections, for example pyramidal projections.

Each cavity may comprise at least a pair of projections extending from the surface adjacent to and on opposing sides of each cavity. Each cavity may comprise two pairs of projections, each pair of projections extending from the surface adjacent to and on opposing sides of each cavity.

The projections may diverge with increasing distance from the surface.

The projections may taper with increasing distance from the surface.

Each cavity may comprise a region that converges with increasing distance from the surface to provide the throat region.

The distance between the projections may increase with distance from the surface so that the air flow path between the projections increases in cross-section with increasing distance from the surface.

In some examples the heatsink may comprise a means for blowing air along each of the plurality of channels.

In some examples the cavities and projections are extruded. In other examples the cavities and projections are cast.

In another aspect there is provided an electric motor comprising the heatsink described above. The electric motor may comprise the heatsink described above wrapped around the circumference of the exterior of the motor. The heatsink may be in direct thermal contact with the stator windings of the electric motor.

DRAWINGS

Embodiments of the disclosure will now be described, by way of example only, with reference to the accompanying drawings, in which.

SPECIFIC DESCRIPTION

Embodiments of the claims relate to an improved heatsink that makes use of the Bernoulli's principle/the Venturi effect to improve the dissipation and removal of heat from a heatsink. For example, in embodiments of the disclosure the heatsink comprises cavities each having a throat region configured to restrict the flow of air to speed up air flow away from the heatsink to improve heat dissipation. In some embodiment there are also projections extending away from the heatsink, the projections being adjacent to the throat region of each cavity to further aid in the dissipation of heat due to the flow of air passing from the throat region of each cavity and past the projections. Furthermore, in some examples, the projections may be curved or shaped, for example to form an aerofoil shape, to further aid and improve the flow of air past the projections and thereby further improve the dissipation of heat from the heatsink.

Figure 1:
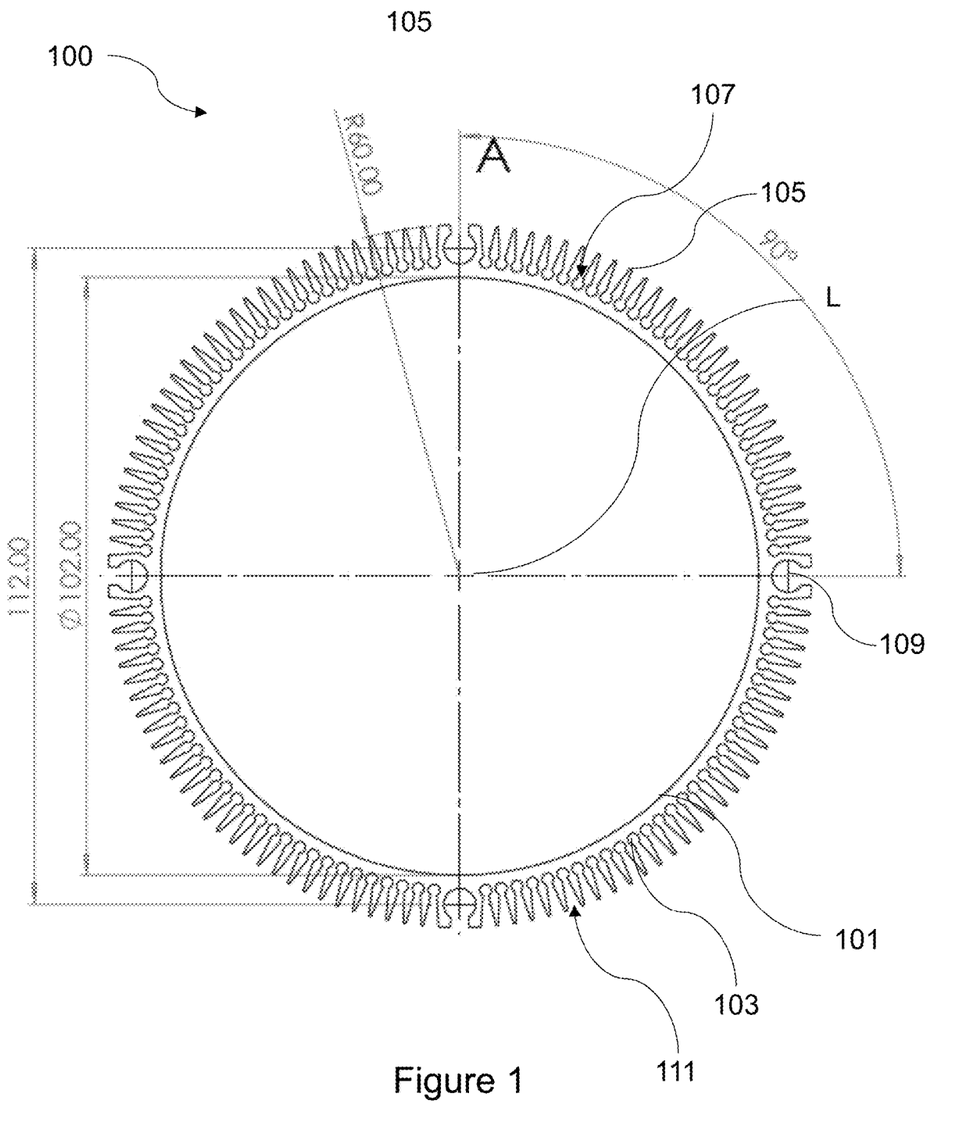
FIG. 1 shows a cross-section of an example heatsink.
Figure 2:
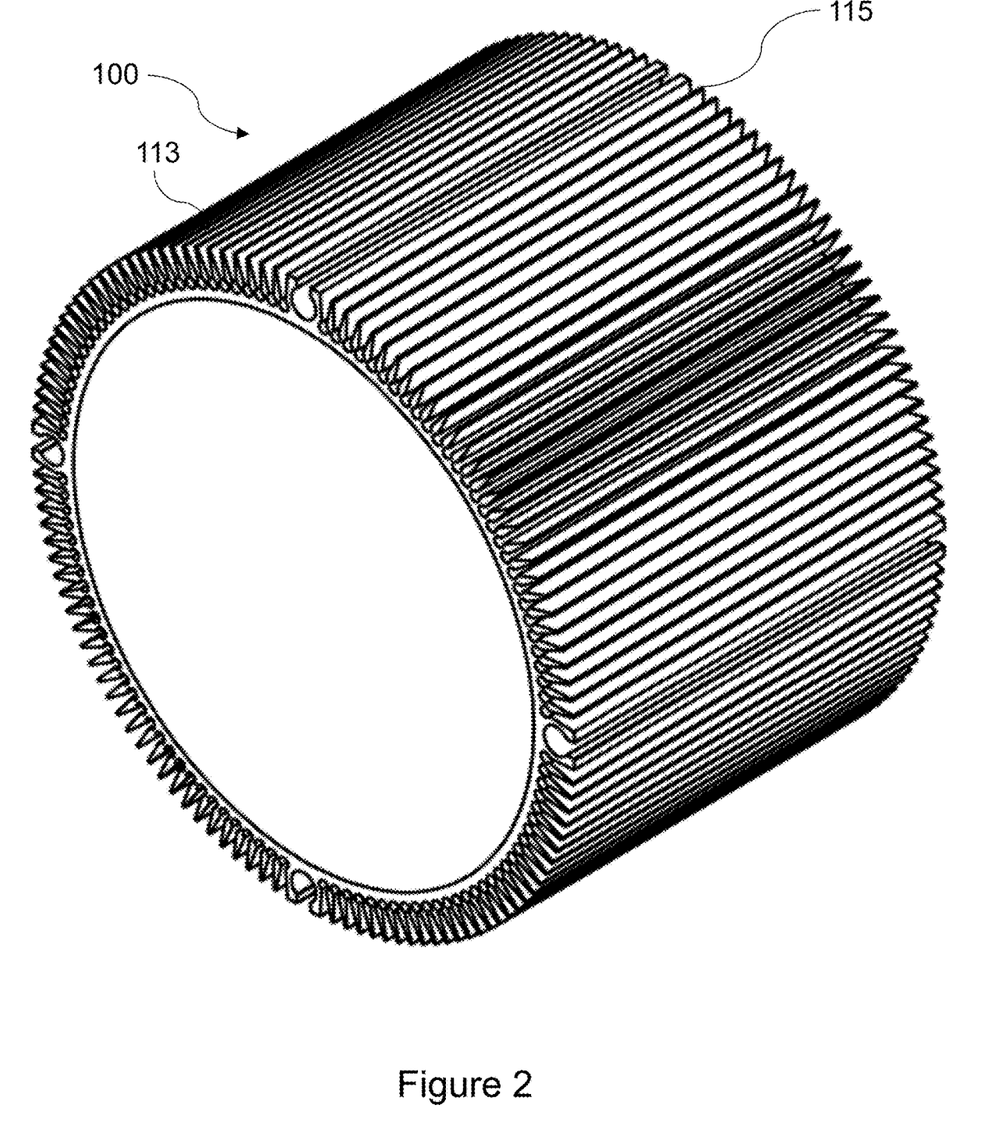
FIG. 2 shows a perspective view of the example heatsink of FIG. 1.

A cross section of an example heat sink 100 is shown in FIG. 1, and a perspective view of the heatsink of FIG. 1 is shown in FIG. 2. In the example shown, this heatsink 100 is circular because it is configured to be mounted around the stator of an electric motor (in some examples the heatsink may form part of a flux ring around the electric motor, but in other examples the heatsink may be configured to be mounted to/around the flux ring). The curvature of the curved heatsink 100 surface 101 is therefore curved about a longitudinal axis L which corresponds to the longitudinal axis, or rotation axis, of the rotor of the electric motor. In some examples the heatsink 100 may be in direct thermal contact with the stator windings of the electric motor.

However, it will be understood that in other examples the heatsink 100 may take other shapes, for example the heatsink may be flat.

Looking at FIG. 1, the heatsink 100 comprises a surface 101 for placing adjacent to the heat source (in this case the stator of the electric motor). A plurality of cavities 103 are formed into the surface 101, the plurality of cavities 103 open on a side of the surface 101 away from the side of the surface for placing adjacent to the heat source. From FIGS. 2 and 3A, because the cavities 103 extend along the heatsink 100 in the direction of the longitudinal axis L, it can be seen that the plurality of cavities 103 are a plurality of parallel channels 113 that extend in a direction parallel to the longitudinal axis L. As can be seen more clearly in FIG. 6A as will be described in more detail below, each of the cavities 103 has a partially circular cross-section, such that the plurality of channels 113 have a partially circular cross-section when viewed along their length.

Adjacent to each cavity 103 on the surface 101 are a pair of projections 105, each projection 105 extending from the surface 101 adjacent to a corresponding cavity 103. Each projection 105 may have a cavity 103 either side of it, such that any two cavities 103 may share a common projection 105. In this way, the heatsink 100 comprises a repeating pattern of channels 113 and ridges 115 extending in a direction transverse to the longitudinal axis L and around the circumference of the heatsink.

Each cavity 103 comprises a throat region 107 configured to restrict the flow of air between each respective cavity 103 and the region between a corresponding pair of projections 105 extending from the surface 101 adjacent to the cavity 103. The throat region 107 of each cavity 103 comprises a region with a reduced width when viewed in cross-section to restrict the flow of air between the cavity 103 and the region between a corresponding pair of projections 105 extending from the surface 101 adjacent to the cavity 103. In the example shown in FIGS. 1 to 3A and 6A the throat section 107 is formed by a chord of the partially circular cross-section of each cavity/channel; however it will be understood that the throat section 107 may be formed in any other way that provides a narrowing or constriction in a direction away from the hot surface to which the heatsink is to be applied; for example each cavity 103 may get wider with increasing depth from the surface 101 adjacent to the projections 105 towards the hot surface and with increasing distance from the projections 105 (for example, each cavity 103 may be triangular-shaped with the base of the triangle being proximal to the hot surface; or in other examples each cavity 103 may be formed from a parallel channel and may have a narrowed or tapered region proximate to the base of each projection 105; in yet further examples the cavity 103 may have any other trapezoidal or elliptical shape that provides a narrowing or constriction proximate to the surface 101 from which the projections 105 project).

Figure 6A:
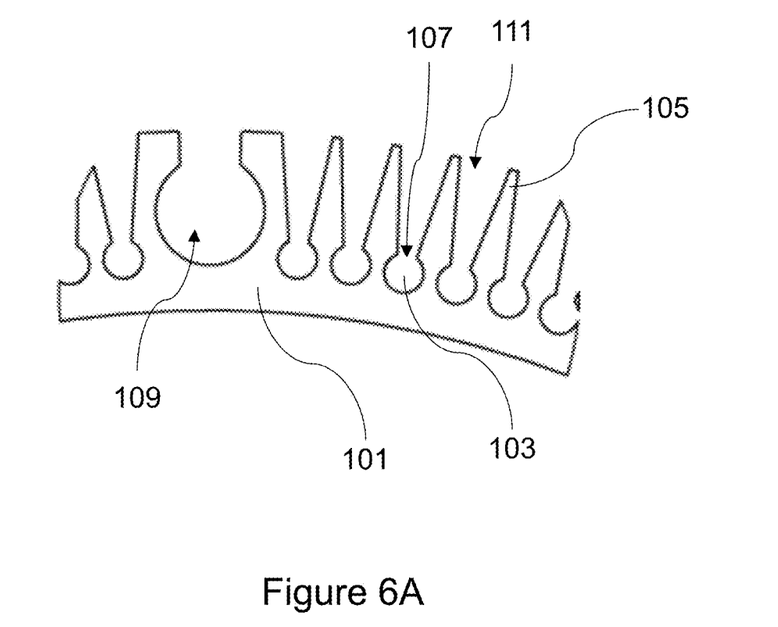
FIG. 6A shows an enlarged view of a portion of the cross-section of FIG. 1.

In the example shown in FIG. 1, and as can be more clearly seen in FIG. 6A, each projection 105 is symmetrical and comprises a tapered fin extending from the surface 101. In the example shown the tapered fins are generally triangular-shaped (in this example forming an isosceles triangle wherein the triangle is longer in a direction away from the surface 101 than it is wide in a plane parallel or tangential to the surface 101), with the base of the triangle forming part of the throat region 107 and the apex of each triangle being the most distal point from the surface 101. As can be seen, for example, in FIG. 2, each of the plurality of fins extends along and parallel to each channel formed by the cavities 103. Due to the shape of the projections 105, the space between the projections 111 increases with increasing distance from the surface 101, such that the projections 105 diverge with increasing distance from the surface 101. In this way the air flow path between the projections 105 increases in cross-section with increasing distance from the surface 101.

As can be seen in FIGS. 1 and 2, at 90° intervals around the circumference of the heatsink, there is a region 109 where there are no cavities 103 or projections 105. This region 109 may be present to advantageously facilitate manufacturing, for example via injection moulding.

Figure 3A:
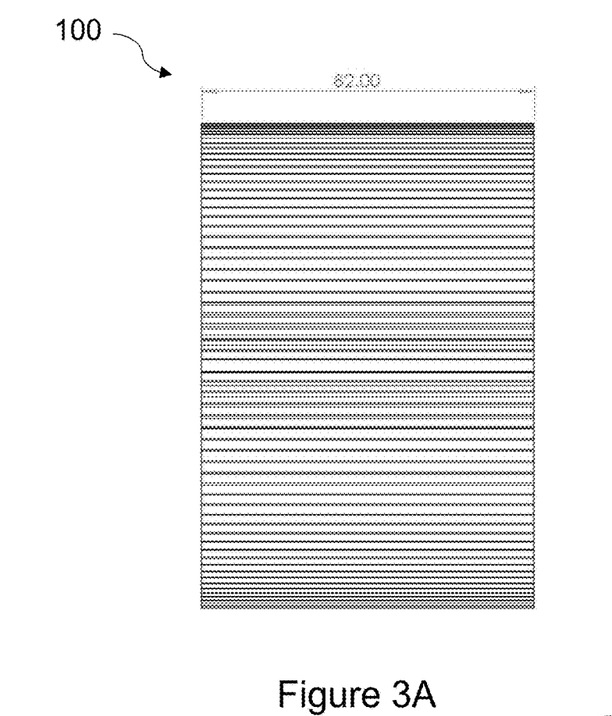
FIG. 3a shows an end view of the example heatsink of FIGS. 1 and 2.
Figure 3B:
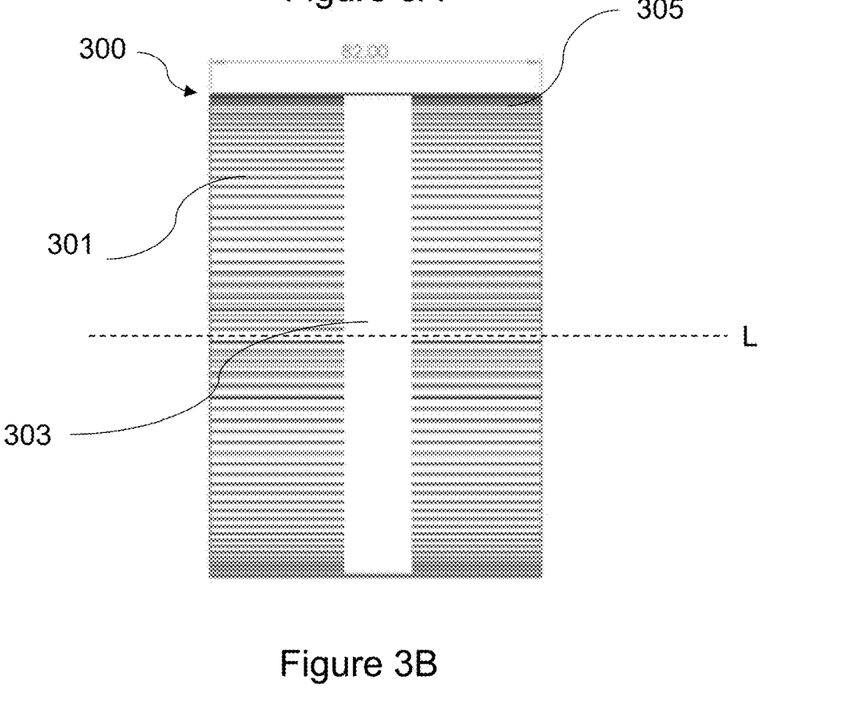
FIG. 3b shows an end view of an alternative example heatsink.

FIG. 3A shows an end view of the example heatsink 100 of FIGS. 1 and 2. From FIGS. 1, 2 and 3A it can be seen that the heatsink 100 is wrapped around the circumference of the circle/hot surface to which the heatsink 100 is to be mounted, and that the heatsink 100 comprises a repeating pattern of channels 113 and projections or ridges 115 extending in a direction transverse to the longitudinal axis L and around the circumference of the heatsink 100. However, it will be understood that in some examples the heatsink may have discontinuities, both in the circumferential direction (i.e. around the stator) but also in a direction parallel to the longitudinal axis. For example, FIG. 3B shows an end view of an alternative example heatsink 300. In this example, the heatsink 300 comprises a proximal region 301, a central region 303, and a distal region 305. The proximal and distal regions 301, 305 are at proximal and distal ends of the longitudinal axis L. The heatsink 300 comprises a plurality of projections and cavities (in this example a repeating pattern of channels and projections around the circumference of the heatsink 300) in the proximal and distal regions, but no cavities or projections in the central region. This may advantageously encourage airflow away from the heatsink; hot air may be drawn along each channel of the proximal 301 and distal regions 305 towards the central region 303, where it is then drawn outward away from the heatsink surface due to convection. This arrangement has surprisingly been found to be particularly effective at dissipating heat.

In the example shown in FIG. 3B, the repeating channels and projections of the proximal and distal regions 301, 305, and in line with each other, however in other examples the proximal 301, central 303 and distal 305 regions may be offset relative to each other around the circumference of the heatsink 300. For example, the proximal region 301 may have a first series of repeating channels 113 and projections 115, the central region 303 may have a second series of repeating channels 113 and projections 115 offset by a first selected angle around the longitudinal axis L (i.e. in a direction transverse to the longitudinal axis) relative to the first series repeating channels 113 and projections 115 of the proximal region 301, and the distal region 305 may have a third series of repeating channels 113 and projections 115 offset by a second selected angle around the longitudinal axis L (i.e. in a direction transverse to the longitudinal axis) relative to the first series of repeating channels 113 and projections 115 of the proximal region 301 and/or the second series of repeating channels 113 and projections 115 of the central region 303.

In some examples the relative spacing of the repeating channels 113 and projections 115 of the proximal 301, central 303 and distal regions 305 may be the same, but in other examples the relative spacings may differ—for example the dimensions of the channels 113 and/or projections 115 of one region may differ to another region. Advantageously offsetting the channel and projections around the circumference of the heatsink in this way may encourage airflow around and away from the heatsink, for example in a circular or spiral manner around and along the longitudinal axis L.

The projections 105 or fins extending away from the surface of the heatsink may take a number of different forms and shapes, and in some cases may not be present at all—for example with the throat section 107 providing enough of a restriction for the venturi effect to occur.

Figure 4:
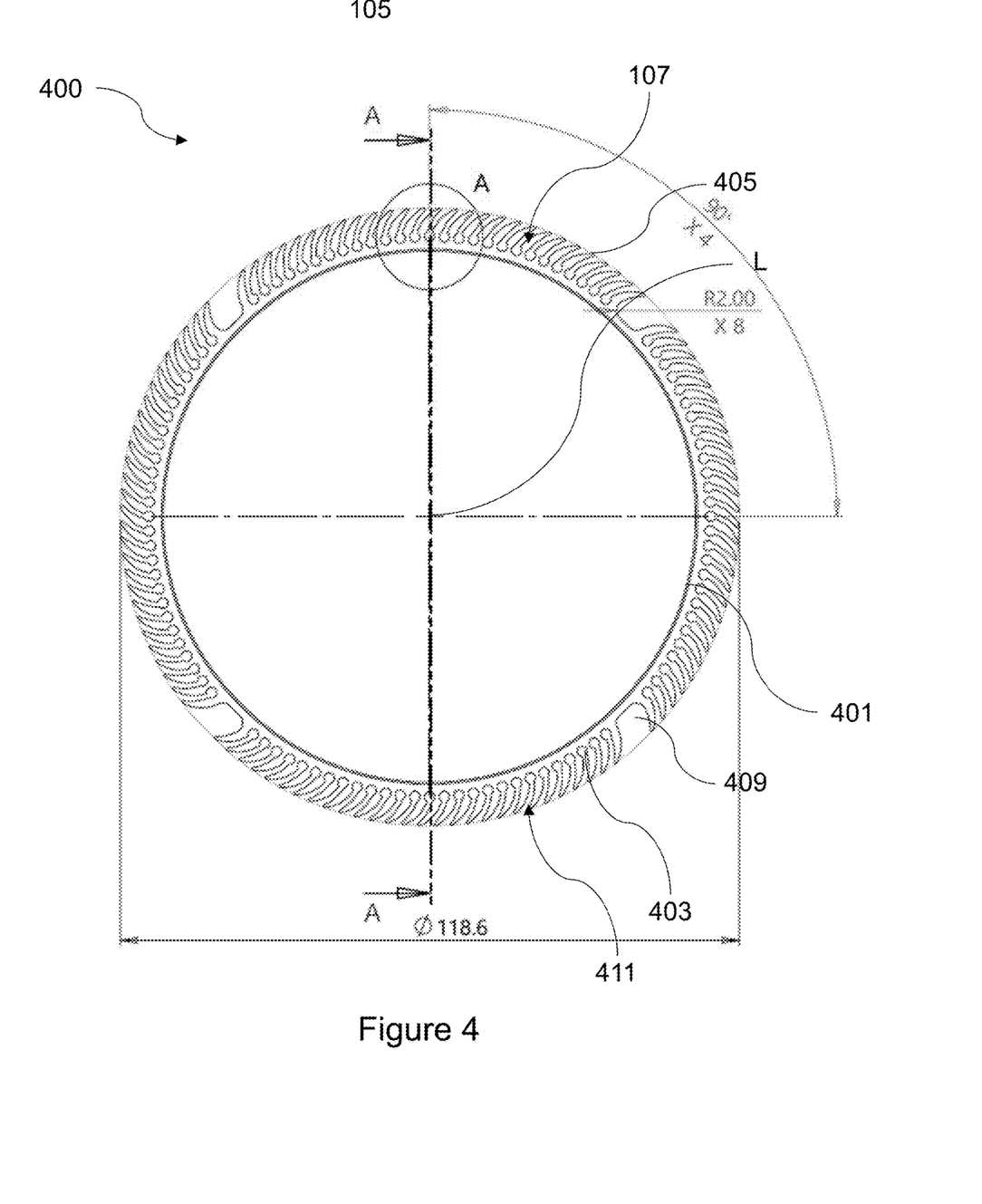
FIG. 4 shows a cross-section of another example heatsink.
Figure 5:
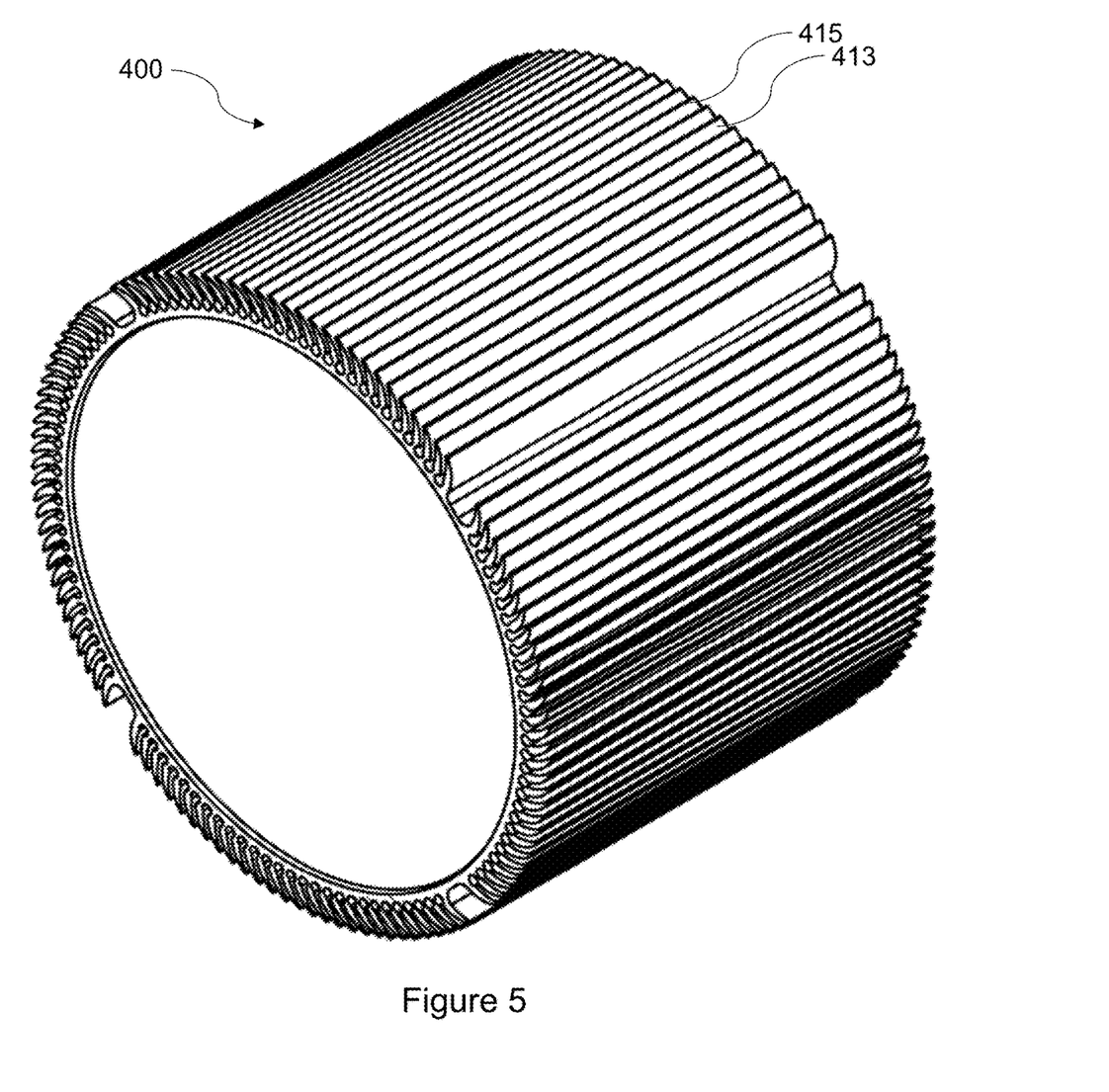
FIG. 5 shows a perspective view of the example heatsink of FIG. 4.
Figure 6B:
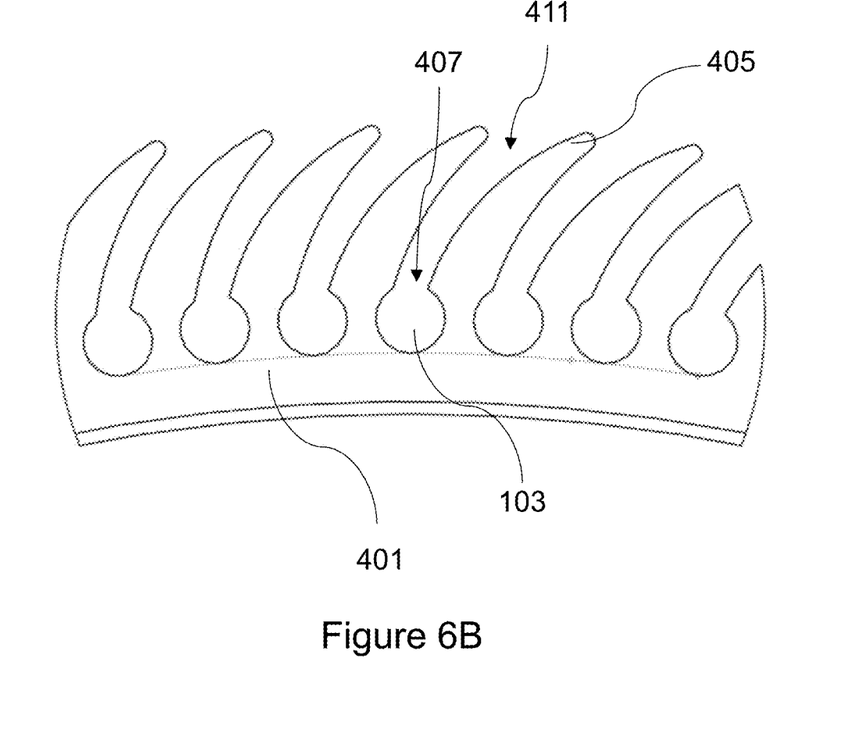
FIG. 6B shows an enlarged view of a portion of the cross-section of FIG. 4.

FIGS. 4, 5 and 6B show another example of a heatsink 400 with projections 405 of a different shape. The example shown in FIGS. 4, 5 and 6B is in many respects similar to the example shown in FIGS. 1 to 3A, with like reference numbers indicating features with a similar or the same functionality.

Looking at FIG. 4, as with the heatsink 100 of FIG. 1, the heatsink 400 comprises a surface 401 for placing adjacent to the heat source (in this case the stator of the electric motor). A plurality of cavities 403 are formed into the surface 401, the plurality of cavities 403 open on a side of the surface 401 away from the side of the surface for placing adjacent to the heat source. From FIG. 5, because the cavities 403 extend along the heatsink 400 in the direction of the longitudinal axis L, it can be seen that the plurality of cavities 403 are a plurality of parallel channels 413 that extend in a direction parallel to the longitudinal axis L. As can be seen more clearly in FIG. 6b as will be described in more detail below, each of the cavities 403 has a partially circular cross-section, such that the plurality of channels 413 have a partially circular cross-section when viewed along their length.

Adjacent to each cavity 403 on the surface 401 are a pair of projections 405, each projection 405 extending from the surface 401 adjacent to a corresponding cavity 403. Each projection 405 may have a cavity 403 either side of it, such that any two cavities 403 may share a common projection 405. In this way, the heatsink 400 comprises a repeating pattern of channels 413 and projections 415 extending in a direction transverse to the longitudinal axis L and around the circumference of the heatsink.

Each cavity 403 comprises a throat region 407 configured to restrict the flow of air between each respective cavity 403 and the region between a corresponding pair of projections 405 extending from the surface 401 adjacent to the cavity 403. The throat region 407 of each cavity 403 comprises a region with a reduced width when viewed in cross-section to restrict the flow of air between the cavity 403 and the region between a corresponding pair of projections 405 extending from the surface 400 adjacent to the cavity 403. In the example shown in FIGS. 4, 5 and 6B the throat section 407 is formed by a chord of the partially circular cross-section of each cavity/channel; however it will be understood that the throat section 407 may be formed in any other way that provides a narrowing or constriction in a direction away from the hot surface to which the heatsink is to be applied.

In the example shown in FIG. 4, and as can be more clearly seen in FIG. 6B, each projection 405 is symmetrical and comprises a tapered aerofoil-shaped fin extending from the surface 401. In the example shown in FIGS. 4, 5 and 6B, each of the plurality of projections or fins 405 have a camber extending away from the surface 401 adjacent to each cavity 403. In this way each of the projections 405 forms an aerofoil-type shape extending away from the surface 401 of the heatsink. In the example shown the tapered fins 405 are cambered and have a base forming part of the throat region 407 and the apex of each fin being the most distal point from the surface 401. Each of the plurality of fins extends along and parallel to each channel formed by the cavities 403 in a direction parallel to the longitudinal axis L. Due to the shape of the projections 405, and the fact that they are formed on the curved surface 401, the space between the projections 411 increases with increasing distance from the surface 401, such that the projections 405 diverge with increasing distance from the surface 401. In this way, the air flow path between the projections 405 increases in cross-section with increasing distance from the surface 401.

As can be seen in FIG. 5, at 90° intervals around the circumference of the heatsink, there is a region 409 where there are no cavities 403 or projections 405. This region 409 may be present to advantageously facilitate manufacturing, for example via injection moulding.

As mentioned above, although the heatsink 100, 400 described above is configured for use with an electric motor and is thereby curved to form around the electric motor, in other examples the heatsink may be flat. It will be appreciated that in examples where the heatsink is flat, it may also comprise a series of repeating channels and fins or projections as described above, for example with reference to FIGS. 1 to 6B.

Figure 7:
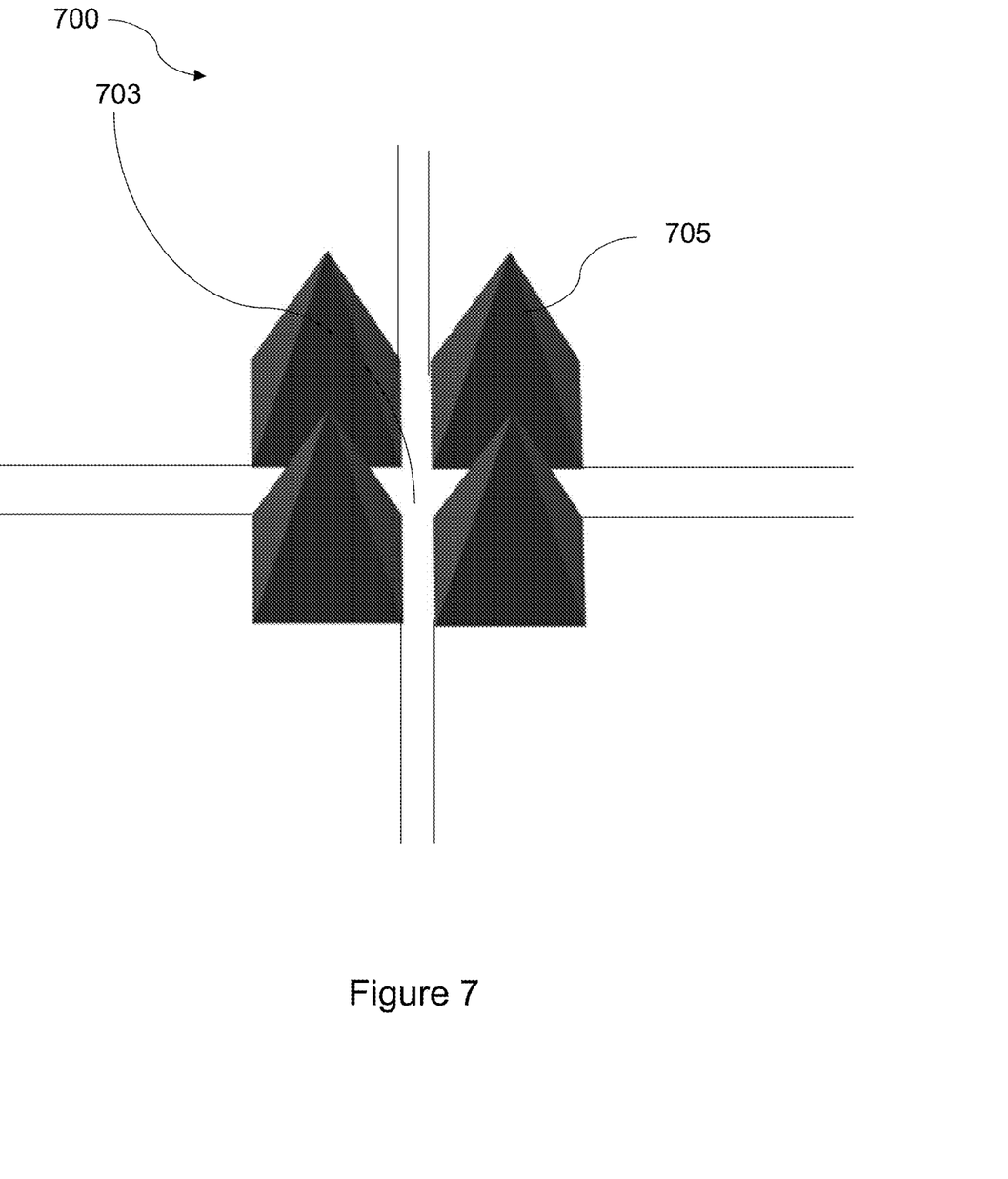
FIG. 7 shows a perspective view of another example heatsink.

FIG. 7 shows a perspective view of an example heatsink 700 that is flat. Because this heatsink is flat it will be understood that it may be used for cooling items other than electric motors—for example, electronic components. For example, the heatsink may be used as a motherboard heatsink, a solid-state and relay heat sink, a heatsink for power electronics, a power transistor heat sink, a PCB heat sink, an external/internal laptop heatsink, and a heat sinks for amplifiers. The heatsink 700 shown in FIG. 7 has two pairs of projections 705 adjacent to and on opposing sides of a central cavity 703. The cavity 703 may be spherical in shape with a throat region proximate to the base of each of the projections 705, such that it can make use of the Venturi effect as with the example heatsinks 100, 400 described above. In the example shown in FIG. 7, the projections 705 are square based pyramids, but it will be understood that the projections 705 may take other forms, for example the projections 705 may be aerofoil-shaped. Furthermore, while in this example the cavity 703 is described as being a spherical cavity, it will be understood that in other examples the heatsink 700 may have a network of intersecting channels, each channel having a constricted throat section, with each channel being intersected by repeating projections 705, in the manner in which streets may intersect "blocks" of housing/accommodation. For example, there may be a first series of repeating channels extending in first direction, and a second series of repeating channels extending in a second direction transverse and orthogonal to the first direction.

It will be understood that the channels may have a depth D in the work surface, and that the width of the channel may increase with increasing distance from the surface towards the surface from which heat is being extracted.

It is envisaged that in some embodiments there is provided an electric motor comprising the heatsink described herein.

It will be appreciated from the discussion above that the embodiments shown in the Figures are merely exemplary, and include features which may be generalised, removed or replaced as described herein and as set out in the claims.

In some examples the heatsink may comprise a means for blowing air along each of the plurality of channels. For example, an air blower such as a fan or similar may be attached to one end of the heat sink to blow air down the channels of the heat sink. In examples where the heatsink is attached to an electric motor, for example, the electric motor may comprise a fan or blades to blow air back over the heatsink.

The heatsink 100, 400 may be formed by casting, injection moulding or, for example, by an additive or subtractive manufacturing process, such as 3D printing.

For example, the heatsink may be manufactured by 3D printing. The heatsink 100, 400 or any component thereof, may also be manufactured by assembling pre-manufactured components together such as by adhering a sheetlike element to a substrate. This may be done by laying down a preformed track of the material, or by laying down a larger sheet and then etching it away. This sheetlike element may be grown or deposited as a layer on the substrate. If it is deposited a mask may be used so the deposition happens only on regions which are to carry the track and/or it may be allowed to take place over a larger area and then selectively etched away.

Other methods of manufacture may also be used. For example, the heatsink 100, 400 may be manufactured by way of '3D printing' whereby a three-dimensional model of the heatsink 100, 400 is supplied, in machine readable form, to a '3D printer' adapted to manufacture the heatsink 100, 400. This may be by additive means such as extrusion deposition, Electron Beam Freeform Fabrication (EBF), granular materials binding, lamination, photopolymerization, or stereolithography or a combination thereof. The machine readable model comprises a spatial map of the object to be printed, typically in the form of a Cartesian coordinate system defining the object's surfaces. This spatial map may comprise a computer file which may be provided in any one of a number of file conventions. One example of a file convention is a STL (STereoLithography) file which may be in the form of ASCII (American Standard Code for Information Interchange) or binary and specifies areas by way of triangulated surfaces with defined normals and vertices. An alternative file format is AMF (Additive Manufacturing File) which provides the facility to specify the material and texture of each surface as well as allowing for curved triangulated surfaces. The mapping of the heatsink 100, 400 may then be converted into instructions to be executed by 3D printer according to the printing method being used. This may comprise splitting the model into slices (for example, each slice corresponding to an x-y plane, with successive layers building the z dimension) and encoding each slice into a series of instructions. The instructions sent to the 3D printer may comprise Numerical Control (NC) or Computer NC (CNC) instructions, preferably in the form of G-code (also called RS-274), which comprises a series of instructions regarding how the 3D printer should act. The instructions vary depending on the type of 3D printer being used, but in the example of a moving printhead the instructions include: how the printhead should move, when/where to deposit material, the type of material to be deposited, and the flow rate of the deposited material.

In the context of the present disclosure other examples and variations of the apparatus and methods described herein will be apparent to a person of skill in the art.

The Specification is Understood with Respect to the Following Numbered Paragraphs:

Numbered Paragraph 1. A heatsink for removing heat from a heat source, the heatsink comprising:
a surface for placing adjacent to the heat source comprising a plurality of cavities formed into the surface, the plurality of cavities open on a side of the surface away from the side of the surface for placing adjacent to the heat source; and
a plurality of projections, each projection extending from the surface adjacent to a corresponding cavity;
wherein each cavity comprises a throat region configured to restrict the flow of air between each respective cavity and the region between a corresponding pair of projections extending from the surface adjacent to the cavity.

Numbered Paragraph 2. The heatsink of Numbered Paragraph 1 wherein the throat region of each cavity comprises a region with a reduced width when viewed in cross-section to restrict the flow of air between the cavity and the region between a corresponding pair of projections extending from the surface adjacent to the cavity.

Numbered Paragraph 3. The heatsink of Numbered Paragraphs 1 or 2 wherein the plurality of cavities comprises a plurality of parallel channels.

Numbered Paragraph 4. The heatsink of Numbered Paragraph 3 wherein the surface comprises a curved surface, the curvature of the curved surface being about a longitudinal axis, and wherein the plurality of parallel channels are parallel to the longitudinal axis.

Numbered Paragraph 5. The heatsink of Numbered Paragraphs 3 or 4 wherein the plurality of channels have a partially circular cross-section when viewed along their length.

Numbered Paragraph 6. The heatsink of Numbered Paragraph 5 wherein the throat region is formed by a chord of the partially circular cross-section.

Numbered Paragraph 7. The heatsink of any of the previous Numbered Paragraphs wherein the plurality of projections comprises a plurality of fins extending from the surface.

Numbered Paragraph 8. The heatsink of Numbered Paragraph 7 as dependent on Numbered Paragraph 4, or any Numbered Paragraph as dependent thereon, wherein each of the plurality of fins extends along and parallel to each channel.

Numbered Paragraph 9. The heatsink of Numbered Paragraphs 7 or 8 wherein each of the plurality of fins have a camber extending away from the surface adjacent to each cavity.

Numbered Paragraph 10. The heatsink of Numbered Paragraph 9 wherein each of the plurality of fins have an aerofoil shape when viewed in a plane perpendicular to the surface.

Numbered Paragraph 11. The heatsink of Numbered Paragraph 8, or any Numbered Paragraph as dependent thereon, wherein the heatsink comprises a repeating pattern of channels and fins extending in a direction transverse to the longitudinal axis.

Numbered Paragraph 12. The heatsink of Numbered Paragraph 11, wherein the heatsink comprises:
a first series of repeating channels and fins in a first portion of the heatsink occupying a first length of the longitudinal axis;
a second series of repeating channels and fins in a second portion of the heatsink occupying a second length of the longitudinal axis;
wherein the first and second series of repeating channels are offset with each other in a direction transverse to the longitudinal axis such that the channels and fins of the first and second series do not align in the longitudinal axis.

Numbered Paragraph 13. The heatsink of any of the previous Numbered Paragraphs, wherein the heatsink comprises a proximal region, a central region, and a distal region, and wherein the heatsink comprises a plurality of projections and cavities in the proximal and distal regions, but no cavities or projections in the central region.

1 Numbered Paragraph 4. The heatsink of any of Numbered Paragraphs 1 to 6 wherein the plurality of projections comprises a plurality of pyramidal structures extending from the surface.

Numbered Paragraph 15. The heatsink of any of the previous Numbered Paragraphs wherein each cavity comprises at least a pair of projections extending from the surface adjacent to and on opposing sides of each cavity.

Numbered Paragraph 16. The heatsink of any Numbered Paragraphs 1 to 6 and 14, wherein each cavity comprises two pairs of projections, each pair of projections extending from the surface adjacent to and on opposing sides of each cavity.

Numbered Paragraph 17. The heatsink of any of the previous Numbered Paragraphs wherein the projections diverge with increasing distance from the surface.

Numbered Paragraph 18. The heatsink of any of the previous Numbered Paragraphs wherein the projections taper with increasing distance from the surface.

Numbered Paragraph 19. The heatsink of any of the previous Numbered Paragraphs wherein each cavity comprises a region that converges with increasing distance from the surface to provide the throat region.

Numbered Paragraph 20. The heatsink of any of the previous Numbered Paragraphs wherein the distance between the projections increases with distance from the surface so that the air flow path between the projections increases in cross-section with increasing distance from the surface.

Numbered Paragraph 21. The heatsink of Numbered Paragraph 3, or any Numbered Paragraph as dependent thereon, comprising a means for blowing air along each of the plurality of channels.

Numbered Paragraph 22. The heatsink of any of the previous Numbered Paragraphs wherein the cavities and projections are extruded.

Numbered Paragraph 23. The heatsink of any of the previous Numbered Paragraphs wherein the cavities and projections are cast.

Numbered Paragraph 24. An electric motor comprising the heatsink of any of the previous Numbered Paragraphs.

Numbered Paragraph 25. The electric motor of Numbered Paragraph 24 comprising the heatsink of any of Numbered Paragraphs 1 to 23 wrapped around the circumference of the exterior of the motor.

Numbered Paragraph 26. The electric motor of Numbered Paragraphs 24 or 25 wherein the heatsink is in direct thermal contact with the stator windings of the electric motor.

The invention claimed is:

1. A heatsink for removing heat from a heat source, the heatsink comprising:
   a surface for placing adjacent to the heat source comprising a plurality of cavities formed into the surface, the plurality of cavities open on a side of the surface away from the side of the surface for placing adjacent to the heat source; and
   a plurality of projections, each projection extending from the surface adjacent to a corresponding cavity;
   wherein each cavity comprises a throat region configured to restrict the flow of air between each respective cavity and the region between a corresponding pair of projections extending from the surface adjacent to the cavity;
   wherein the plurality of projections comprises a plurality of fins extending from the surface, wherein each of the plurality of fins have a camber extending away from the surface adjacent to each cavity, and wherein each of the plurality of fins have an aerofoil shape when viewed in a plane perpendicular to the surface.

2. The heatsink of claim 1, wherein the throat region of each cavity comprises a region with a reduced width when viewed in cross-section to restrict the flow of air between the cavity and the region between a corresponding pair of projections extending from the surface adjacent to the cavity.

3. The heatsink of claim 1, wherein the plurality of cavities comprises a plurality of parallel channels.

4. The heatsink of claim 3, wherein the surface comprises a curved surface, the curvature of the curved surface being about a longitudinal axis, and wherein the plurality of parallel channels are parallel to the longitudinal axis.

5. The heatsink of claim 3, wherein the plurality of channels have a partially circular cross-section when viewed along their length.

6. The heatsink of claim 5, wherein the throat region is formed by a chord of the partially circular cross-section.

7. The heatsink of claim 1, wherein each of the plurality of fins extends along and parallel to each channel.

8. The heatsink of claim 7, wherein the heatsink comprises a repeating pattern of channels and fins extending in a direction transverse to the longitudinal axis.

9. The heatsink of claim 1, wherein the projections taper with increasing distance from the surface.

10. The heatsink of claim 1, wherein each cavity comprises a region that converges with increasing distance from the surface to provide the throat region.

11. The heatsink of claim 1, wherein the distance between the projections increases with distance from the surface so that the air flow path between the projections increases in cross-section with increasing distance from the surface.

12. The heatsink of claim 1, wherein the cavities and projections are extruded.

13. The heatsink of claim 1, wherein the cavities and projections are cast.

14. An electric motor comprising the heatsink of claim 1.

15. The electric motor of claim 14, wherein the heat sink is wrapped around the circumference of the exterior of the motor.

* * * * *